(12) United States Patent
Ledwith, Jr.

(10) Patent No.: US 11,905,914 B2
(45) Date of Patent: Feb. 20, 2024

(54) LIQUID HYDROGEN-LIQUID OXYGEN FUELED POWERPLANT

(71) Applicant: Raytheon Technologies Corporation, Farmington, CT (US)

(72) Inventor: Walter A. Ledwith, Jr., Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 61 days.

(21) Appl. No.: 17/670,107

(22) Filed: Feb. 11, 2022

(65) Prior Publication Data
US 2023/0258148 A1     Aug. 17, 2023

(51) Int. Cl.
*F02K 9/42*     (2006.01)
*B64G 1/40*     (2006.01)
(Continued)

(52) U.S. Cl.
CPC ............... *F02K 9/42* (2013.01); *B64G 1/401* (2013.01); *B64G 1/402* (2013.01); *F02K 9/48* (2013.01); *F02K 9/62* (2013.01); *F02C 3/20* (2013.01); *F02C 3/22* (2013.01); *F02C 7/22* (2013.01); *F02C 7/224* (2013.01); *F02K 1/08* (2013.01); *F02K 9/84* (2013.01); *F05D 2210/12* (2013.01);
(Continued)

(58) Field of Classification Search
CPC ..... F02K 9/42; F02K 9/48; F02K 9/62; F02K 1/08; F02K 9/84; B64G 1/401; B64G 1/402; F02C 3/20; F02C 3/22; F02C 7/22; F02C 7/224
See application file for complete search history.

(56) References Cited

U.S. PATENT DOCUMENTS 3,541,793 A * 11/1970 Gunther ................... F02K 9/48
                                                        60/225
4,073,138 A *  2/1978 Beichel .................... F02K 9/48
                                                        60/245
(Continued)

FOREIGN PATENT DOCUMENTS

EP     3048281 B1    4/2017
FR     2637018 A1    3/1990
(Continued)

OTHER PUBLICATIONS

EP Search Report for EP Patent Application No. 23156280.2 dated Jul. 10, 2023.

*Primary Examiner* — Gerald L Sung
*Assistant Examiner* — Rene D Ford
(74) *Attorney, Agent, or Firm* — Getz Balich LLC

(57) ABSTRACT

A powerplant is provided that includes a pre-burner, a combustor, a power turbine, a mechanical load and a propellant system. The combustor is fluidly coupled with and downstream of the pre-burner. The power turbine is fluidly coupled with and downstream of the combustor. The mechanical load is rotatably driven by the power turbine. The propellant system is configured to direct fluid oxygen and fluid hydrogen to the pre-burner to provide an oxygen rich fuel mixture for combustion within the pre-burner. The propellant system is also configured to direct the fluid hydrogen to the combustor for combustion within the combustor with oxygen within combustion products received from the pre-burner.

16 Claims, 11 Drawing Sheets

(51) Int. Cl.
*F02K 9/48* (2006.01)
*F02K 9/62* (2006.01)
*F02C 3/20* (2006.01)
*F02C 3/22* (2006.01)
*F02C 7/22* (2006.01)
*F02C 7/224* (2006.01)
*F02K 1/08* (2006.01)
*F02K 9/84* (2006.01)
*F23R 3/34* (2006.01)

(52) U.S. Cl.
CPC .... *F05D 2220/323* (2013.01); *F05D 2240/36* (2013.01); *F05D 2260/213* (2013.01); *F05D 2260/232* (2013.01); *F05D 2260/608* (2013.01); *F23R 3/34* (2013.01); *F23R 2900/03341* (2013.01)

(56) References Cited

U.S. PATENT DOCUMENTS

| | | | | |
|---|---|---|---|---|
| 4,462,204 A | * | 7/1984 | Hull | F23R 3/26 |
| | | | | 415/115 |
| 4,592,202 A | * | 6/1986 | Stewart | F02K 9/78 |
| | | | | 416/171 |
| 4,625,753 A | * | 12/1986 | Gustafson | F17C 5/02 |
| | | | | 62/50.7 |
| 4,686,824 A | * | 8/1987 | Dunaway | F02K 9/82 |
| | | | | 60/254 |
| 5,014,508 A | | 5/1991 | Lifka | |
| 5,052,176 A | | 10/1991 | Josiane | |
| 5,159,809 A | | 11/1992 | Ciais | |
| 7,721,524 B2 | | 5/2010 | Jahnsen | |
| 8,250,853 B1 | * | 8/2012 | Pinera | F02K 9/48 |
| | | | | 60/246 |
| 11,149,691 B2 | * | 10/2021 | Bulk | F02K 9/82 |
| 2006/0064985 A1 | | 3/2006 | Buecker | |
| 2015/0354503 A1 | * | 12/2015 | Vuillamy | F02K 9/52 |
| | | | | 60/264 |
| 2021/0001269 A1 | | 1/2021 | Klingels | |
| 2021/0207500 A1 | | 7/2021 | Klingels | |

FOREIGN PATENT DOCUMENTS

| | | |
|---|---|---|
| GB | 870268 A | 6/1961 |
| GB | 2190964 A | 12/1987 |
| RU | 2561757 C1 | 9/2015 |

\* cited by examiner

LIQUID HYDROGEN-LIQUID OXYGEN FUELED POWERPLANT

BACKGROUND OF THE DISCLOSURE

1. Technical Field

This disclosure relates generally to a powerplant and, more particularly, to a powerplant for use with liquid hydrogen and liquid oxygen.

2. Background Information

As government emissions standards tighten, interest in alternative fuels for gas turbine engines continues to grow. There is interest, for example, in fueling a gas turbine engine with hydrogen ($H_2$) rather than a traditional hydrocarbon fuel such as kerosine to reduce greenhouse emissions. Whiles various hydrogen fueled gas turbine engines are known in the art, there is still room in the art for improvement.

SUMMARY OF THE DISCLOSURE

According to an aspect of the present disclosure, a powerplant is provided that includes a pre-burner, a combustor, a power turbine, a mechanical load and a propellant system. The combustor is fluidly coupled with and downstream of the pre-burner. The power turbine is fluidly coupled with and downstream of the combustor. The mechanical load is rotatably driven by the power turbine. The propellant system is configured to direct fluid oxygen and fluid hydrogen to the pre-burner to provide an oxygen rich fuel mixture for combustion within the pre-burner. The propellant system is also configured to direct the fluid hydrogen to the combustor for combustion within the combustor with oxygen within combustion products received from the pre-burner.

According to another aspect of the present disclosure, another powerplant is provided that includes a first pre-burner, a second pre-burner, a combustor, a power turbine, a mechanical load and a propellant system. The combustor is fluidly coupled with and downstream of the first pre-burner and the second pre-burner. The power turbine is fluidly coupled with and downstream of the combustor. The mechanical load is rotatably driven by the power turbine. The propellant system is configured to direct fluid oxygen and fluid hydrogen to the first pre-burner and the second pre-burner. The propellant system is also configured to direct the fluid hydrogen to the combustor.

According to still another aspect of the present disclosure, another powerplant is provided that includes a pre-burner, a combustor, a power turbine, a mechanical load and a propellant system. The combustor is fluidly coupled with and downstream of the pre-burner. The power turbine is fluidly coupled with and downstream of the combustor. The mechanical load is rotatably driven by the power turbine. The propellant system is configured to direct fluid oxygen and fluid hydrogen to the pre-burner. The fuel system is configured to direct the fluid hydrogen to the combustor. The propellant system is also configured to direct the fluid oxygen to the power turbine for cooling the power turbine.

The propellant system may be configured to direct the fluid oxygen and the fluid hydrogen into the first pre-burner and the second pre-burner for combustion. The fuel system may also be configured to direct the fluid hydrogen into the combustor for combustion with oxygen within combustion products received from the first pre-burner and the second pre-burner.

The fluid oxygen directed to the pre-burner may be or otherwise include liquid oxygen. In addition or alternatively, the fluid hydrogen directed to the pre-burner may be or otherwise include liquid hydrogen.

The fluid hydrogen directed to the combustor may be or otherwise include liquid hydrogen.

The fluid hydrogen directed to the combustor may be or otherwise include hydrogen gas.

The propellant system may include an oxygen reservoir and an oxygen turbopump. The oxygen turbopump may include a turbopump turbine and a turbopump pump. The turbopump turbine may be fluidly coupled with and between the pre-burner and the combustor. The turbopump pump may be rotatably driven by the turbopump turbine. The turbopump pump may be configured to direct the fluid oxygen from the oxygen reservoir to the pre-burner.

The propellant system may also include a heater configured for heating the fluid oxygen within the oxygen reservoir.

The powerplant may also include an overpressure vent configured to fluidly couple the oxygen reservoir to an environment outside of the powerplant.

The propellant system may also include a hydrogen reservoir and a hydrogen turbopump. The hydrogen turbopump may include a turbopump turbine and a turbopump pump. The turbopump turbine may be fluidly coupled with and between the pre-burner and the combustor. The turbopump pump may be rotatably driven by the turbopump turbine. The turbopump pump may be configured to direct the fluid hydrogen from the hydrogen reservoir to the pre-burner and to the combustor.

The propellant system may also include a heater configured for heating the fluid hydrogen within the hydrogen reservoir.

The powerplant may also include an exhaust and an overpressure vent. The exhaust may be fluidly coupled with and downstream of the power turbine. The overpressure vent may be configured to fluidly couple the hydrogen reservoir to the exhaust.

The powerplant may also include a second pre-burner fluidly coupled with and upstream of the combustor. The propellant system may be configured to direct the fluid oxygen and the fluid hydrogen to the second pre-burner to provide a second oxygen rich fuel mixture for combustion within the second pre-burner. The propellant system may also be configured to direct the fluid hydrogen to the combustor for combustion within the combustor with oxygen within second combustion products received from the second pre-burner.

The propellant system may be configured to direct the fluid oxygen to the power turbine for cooling the power turbine.

At least (or only) an upstream section of the power turbine may be cooled using the fluid oxygen. In addition or alternatively, a downstream section of the power turbine may be uncooled.

The propellant system may also include a recuperator. The propellant system may be configured to direct the fluid hydrogen to the combustor through the recuperator. The recuperator may be configured to transfer heat energy from combustion products output from the power turbine to the fluid hydrogen.

The powerplant may also include a variable area exhaust nozzle fluidly coupled with and downstream of the power turbine. Alternatively, the powerplant may include a fixed area exhaust nozzle fluidly coupled with and downstream of the power turbine.

The mechanical load may be configured as or otherwise include a propulsor rotor and/or an electric generator.

The powerplant may also include electrical generator. The electrical generator may include a fuel cell. The propellant system may also be configured to provide the fluid oxygen and the fluid hydrogen to the fuel cell.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
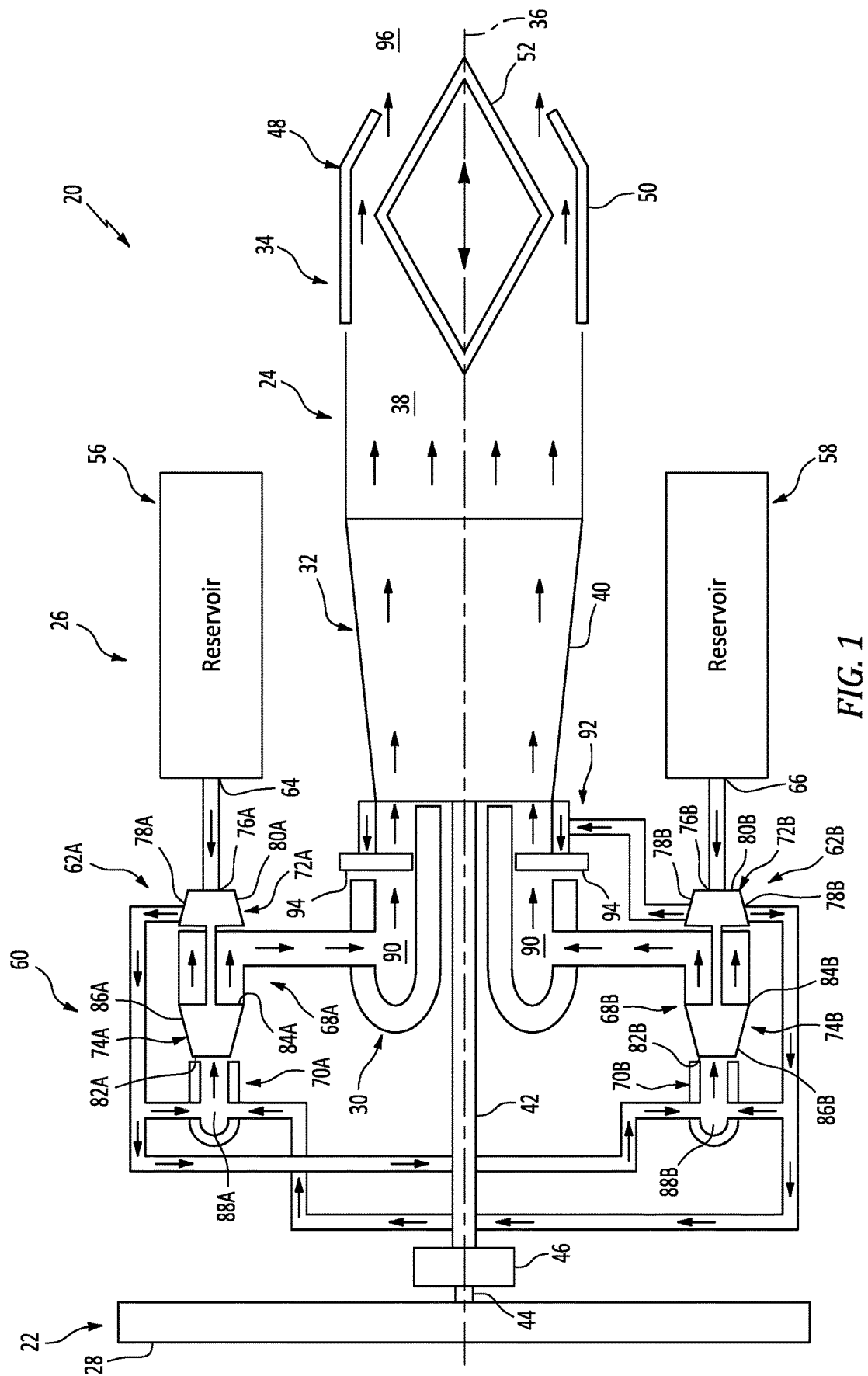
FIG. 1 is a schematic illustration of a powerplant for an aircraft.

FIG. 1 is a schematic illustration of a powerplant 20 having many potential applications such as, but not limited to, an aircraft. This powerplant 20 may be configured as, or otherwise included as part of, a propulsion system and/or an electrical power system for the aircraft. The present disclosure, however, is not limited to aircraft applications. The powerplant 20, for example, may alternatively be configured as, or otherwise included as part of, a propulsion system and/or an electrical power system for another type of vehicle. The powerplant 20 may still alternatively be configured as, or otherwise included as part of, an industrial electrical power system.

The powerplant 20 may be configured as a non-hydrocarbon powerplant/a hydrocarbon free powerplant; e.g., a powerplant that does not use (or require) hydrocarbon fuel for powerplant operation such as, but not limited to, kerosine, jet fuel, etc. The powerplant 20 of FIG. 1, for example, is configured as a hydrogen-oxygen burning powerplant. More particularly, the powerplant 20 of FIG. 1 is configured as a hydrolox powerplant; e.g., a powerplant that burns liquid hydrogen and liquid oxygen, as opposed to other hydrogen fueled powerplants which might burn liquid hydrogen and atmospheric air. Combusting the hydrogen with the oxygen within the hydrolox powerplant will eliminate nitrous oxide emissions, whereas nitrous oxide emissions will still be present when combusting hydrogen with compressed air, for example.

The powerplant 20 includes a mechanical load 22 and a powerplant engine 24 for rotatably driving the mechanical load 22. The powerplant 20 also includes a powerplant propellant system 26 for servicing (e.g., fueling, cooling, etc.) the engine 24.

The mechanical load 22 may be configured as or otherwise include at least one driven rotor 28. The mechanical load 22, for example, may be configured as a bladed propulsor rotor for the aircraft propulsion system. Examples of the propulsor rotor include, but are not limited to, a propeller for a propeller engine (e.g., a turboprop engine), a fan for a ducted fan engine (e.g., a turbofan engine), and an open rotor for an open rotor engine (e.g., a pusher fan engine, an open tractor rotor engine, etc.). The mechanical load 22 may alternatively be configured a generator rotor in an electrical power generator for the power system. The present disclosure, however, is not limited to the foregoing exemplary mechanical loads nor the foregoing exemplary powerplant configurations.

The engine 24 includes an engine combustor 30, an engine power turbine 32 (e.g., a free turbine) and an engine exhaust 34. The combustor 30, the power turbine 32 and the exhaust 34 of FIG. 1 may be arranged sequentially along an axial centerline 36 of the engine 24, which axial centerline 36 may also be a rotational axis for the power turbine 32. The engine 24 of FIG. 1 also includes a core flowpath 38. This core flowpath 38 may start at/within the combustor 30, and projects out of the combustor 30 and sequentially through the power turbine 32 and the exhaust 34. The core flowpath 38 thereby fluidly couples the power turbine 32 with the combustor 30 and the exhaust 34, where the power turbine 32 is downstream of the combustor 30 along the core flowpath 38, and where the exhaust 34 is downstream of the power turbine 32 along the core flowpath 38.

The power turbine 32 includes a bladed power turbine rotor 40 with one or more stages along the axial centerline 36. The power turbine rotor 40 is connected to the driven rotor 28 through a drivetrain. The drivetrain of FIG. 1 includes a turbine rotor shaft 42, a driven rotor shaft 44 and a geartrain 46; e.g., an epicyclic geartrain. The turbine rotor shaft 42 connects the power turbine rotor 40 to the geartrain 46. The driven rotor shaft 44 connects the geartrain 46 to the driven rotor 28. The power turbine rotor 40 may thereby rotatably drive the driven rotor 28 through the drivetrain and its elements 42, 44 and 46. The geartrain 46 may be configured as a speed reduction device such that, for example, a rotational speed of the power turbine rotor 40 and its shaft 42 may be different (e.g., greater) than a rotational speed of the driven rotor 28 and its shaft 44. Of course, in other embodiments, the geartrain 46 may be omitted and the power turbine rotor 40 may directly drive the driven rotor 28.

Figure 2A:
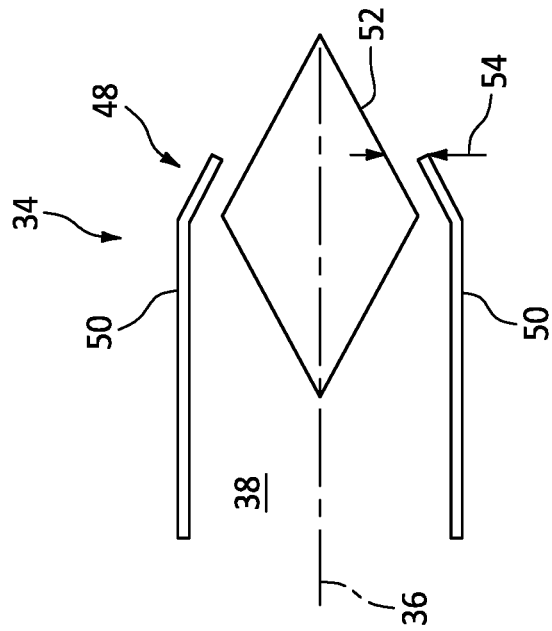
FIG. 2A is a schematic illustration of a variable area exhaust nozzle in an open position.
Figure 2B:
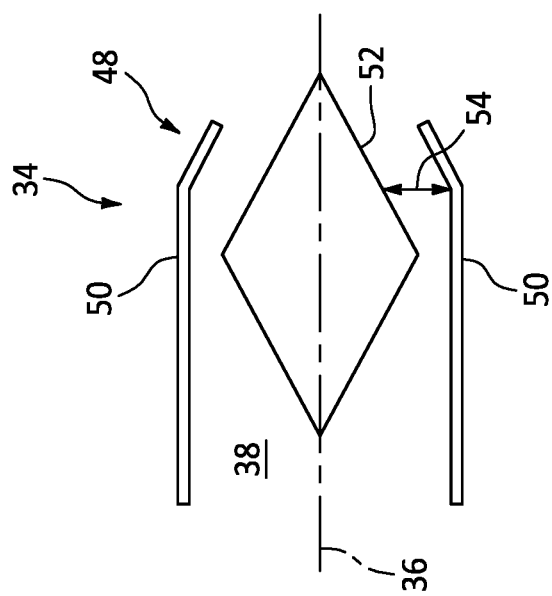
FIG. 2B is a schematic illustration of the variable area exhaust nozzle in a restricted position.

The exhaust 34 may be configured with a variable area exhaust nozzle 48. The exhaust 34 of FIGS. 2A and 2B, for example, includes a stationary body and a moveable body. The stationary body may be or otherwise include an outer (e.g., tubular) exhaust wall 50. The moveable body may be a moveable plug 52 (e.g., a translatable plug nozzle) disposed within a bore of the exhaust wall 50. The moveable plug 52 may be configured to move (e.g., translate) axially along the axial centerline 36 between an upstream position (see FIG. 2A) and a downstream position (see FIG. 2B). At the upstream position of FIG. 2A, a radial distance 54 between an exterior surface of the moveable plug 52 and an interior surface of a nozzle portion of the exhaust wall 50 may have a first value at a reference point axially along the moveable plug 52. At the downstream position of FIG. 2B, the radial distance 54 may have a second value at the reference point that is different (e.g., less) than the first value. The moveable plug 52 may thereby move to its upstream position of FIG. 2A to increase a flow area through the variable area exhaust nozzle 48. By contrast, the moveable plug 52 may move to its downstream position of FIG. 2B to decrease the flow area through the variable area exhaust nozzle 48. Of course, various other types and configurations of variable area exhaust nozzles are known in the art, and the present disclosure is not limited to any particular ones thereof. Furthermore, in other embodiments, the variable area exhaust nozzle 48 may be replaced by a fixed area exhaust nozzle.

The exhaust 34 discharges combustion products to an ambient external environment 96. In doing so, thrust is produced by the nozzle 52. The amount of this thrust is determined in the engine optimization process: i.e., what proportion should the designer chose between the engine fan 22 and the core engine nozzle 52.

The propellant system 26 of FIG. 1 includes an oxygen reservoir 56, a hydrogen reservoir 58 and a pump system 60. The pump system 60 of FIG. 1 includes one or more turbopump systems 62A and 62B (generally referred to as 62).

The oxygen reservoir 56 is configured to contain and hold a quantity of fluid oxygen (e.g., 02); e.g., oxidizer. Within the oxygen reservoir 56, this fluid oxygen may be in a form of entirely (e.g., only) or substantially (e.g., at least 95%) liquid oxygen; e.g., when the oxygen reservoir 56 is substantially full. The oxygen reservoir 56 may be configured as or otherwise include a container; e.g., a tank, a cylinder, a pressure vessel, a bladder, etc. The oxygen reservoir 56 includes an outlet 64.

The hydrogen reservoir 58 is configured to contain and hold a quantity of fluid hydrogen; e.g., fuel, propellant. Within the hydrogen reservoir 58, this fluid hydrogen may be in a form of entirely (e.g., only) or substantially (e.g., at least 95%) hydrogen oxygen; e.g., when the hydrogen reservoir 58 is substantially full. The hydrogen reservoir 58 may be configured as or otherwise include a container; e.g., a tank, a cylinder, a pressure vessel, a bladder, etc. The hydrogen reservoir 58 includes an outlet 66.

The oxygen turbopump system 62A of FIG. 1 includes an oxygen turbopump 68A and an oxygen pre-burner 70A. The oxygen turbopump 68A includes an oxygen turbopump pump 72A and an oxygen turbopump turbine 74A.

The oxygen turbopump pump 72A includes an inlet 76A, an outlet 78A and a bladed oxygen pump rotor 80A between the oxygen pump inlet 76A and the oxygen pump outlet 78A. The oxygen pump inlet 76A is fluidly coupled with and downstream of the oxygen reservoir outlet 64A. The oxygen pump outlet 78A is fluidly coupled (e.g., in parallel) with and upstream of the oxygen pre-burner 70A and a hydrogen pre-burner 70B of the hydrogen turbopump system 62B. The oxygen pump rotor 80A is rotatable about a rotational axis of the oxygen turbopump 68A. The oxygen turbopump pump 72A and its rotor 80A are configured draw the fluid oxygen out of the oxygen reservoir 56 through the oxygen pump inlet 76A, pressurize the fluid oxygen within the oxygen turbopump pump 72A, and direct the pressurized fluid oxygen out of the oxygen pump outlet 78A to the oxygen pre-burner 70A and the hydrogen pre-burner 70B. The fluid oxygen directed out of the oxygen turbopump pump 72A may remain in the form of entirely (e.g., only) or substantially (e.g., at least 95%) liquid oxygen.

The oxygen turbopump turbine 74A includes an inlet 82A, an outlet 84A and a bladed oxygen turbine rotor 86A between the oxygen turbine inlet 82A and the oxygen turbine outlet 84A. The oxygen turbine inlet 82A is fluidly coupled with and downstream of the oxygen pre-burner 70A. The oxygen turbine outlet 84A is fluidly coupled with and upstream of the combustor 30. The oxygen turbopump turbine 74A is thereby fluidly coupled (e.g., serially) in line between a combustion chamber 88A within the oxygen pre-burner 70A and a (e.g., annular) combustion chamber 90 within the combustor 30 and, thus, the core flowpath 38. The oxygen turbine rotor 86A is rotatable about the oxygen turbopump rotational axis. The oxygen turbine rotor 86A is connected to the oxygen pump rotor 80A through a drivetrain; e.g., a shaft. The oxygen turbopump turbine 74A and its rotor 86A are thereby configured to rotatably drive the oxygen turbopump pump 72A and its rotor 80A.

The hydrogen turbopump system 62B of FIG. 1 includes a hydrogen turbopump 68B and the hydrogen pre-burner 70B. The hydrogen turbopump 68B includes a hydrogen turbopump pump 72B and a hydrogen turbopump turbine 74B.

The hydrogen turbopump pump 72B includes an inlet 76B, one or more outlets 78B and a bladed hydrogen pump rotor 80B between the hydrogen pump inlet 76B and the hydrogen pump outlet(s) 78B. The hydrogen pump inlet 76B is fluidly coupled with and downstream of the hydrogen reservoir outlet 66. The hydrogen pump outlets 78B are fluidly coupled (e.g., in parallel) with and upstream of the hydrogen pre-burner 70B, the oxygen pre-burner 70A and a hydrogen injection system 92. This hydrogen injection system 92 is configured to direct the fluid hydrogen into the combustion chamber 90 of the combustor 30. The hydrogen injection system 92 of FIG. 1, for example, includes one or more spray bars 94 arranged about the axial centerline 36 and disposed within (e.g., projecting into) the combustion chamber 90 of the combustor 30. The hydrogen pump rotor 80B is rotatable about a rotational axis of the hydrogen turbopump 68B. The hydrogen turbopump pump 72B and its rotor 80B are configured draw the fluid hydrogen out of the hydrogen reservoir 58 through the hydrogen pump inlet 76B, pressurize the fluid hydrogen within the hydrogen turbopump pump 72B, and direct the pressurized fluid hydrogen out of one of the hydrogen pump outlets 78B to the hydrogen pre-burner 70B and the oxygen pre-burner 70A. The fluid hydrogen directed out of the hydrogen turbopump pump 72B may remain in the form of entirely (e.g., only) or substantially (e.g., at least 95%) liquid hydrogen.

The hydrogen turbopump turbine 74B includes an inlet 82B, an outlet 84B and a bladed hydrogen turbine rotor 86B between the hydrogen turbine inlet 82B and the hydrogen turbine outlet 84B. The hydrogen turbine inlet 82B is fluidly coupled with and downstream of the hydrogen pre-burner 70B. The hydrogen turbine outlet 84B is fluidly coupled with and upstream of the combustor 30. The hydrogen turbopump turbine 74B is thereby fluidly coupled (e.g., serially) in line between a combustion chamber 88B within the hydrogen pre-burner 70B and the combustion chamber 90 within the combustor 30 and, thus, the core flowpath 38. The hydrogen turbine rotor 86B is rotatable about the hydrogen turbopump rotational axis. The hydrogen turbine rotor 86B is connected to the hydrogen pump rotor 80B through a drivetrain; e.g., a shaft. The hydrogen turbopump turbine 74B and its rotor 86B are thereby configured to rotatably drive the hydrogen turbopump 72B and its rotor 80B.

During operation of the powerplant 20 of FIG. 1, the oxygen turbopump system 62A draws the fluid oxygen out of the oxygen reservoir 56, pressurizes the fluid oxygen within the oxygen turbopump 68A, and directs the pressurized fluid oxygen to the oxygen pre-burner 70A and the hydrogen pre-burner 70B. The pressurized fluid oxygen received at the oxygen pre-burner 70A and the hydrogen pre-burner 70B may remain in the form of entirely or substantially liquid oxygen. This pressurized fluid oxygen is directed (e.g., injected) into the combustion chamber 88A of the oxygen pre-burner 70A and the combustion chamber 88B of the hydrogen pre-burner 70B.

The hydrogen turbopump system 62B draws the fluid hydrogen out of the hydrogen reservoir 58, pressurizes the fluid hydrogen within the hydrogen turbopump 68B, and directs the pressurized fluid hydrogen to the hydrogen pre-burner 70B and the oxygen pre-burner 70A. The pressurized fluid hydrogen received at the hydrogen pre-burner 70B and the oxygen pre-burner 70A may remain in the form of entirely or substantially liquid hydrogen. This pressurized fluid hydrogen is directed (e.g., injected) into the combustion chamber 88B of the hydrogen pre-burner 70B and the combustion chamber 88A of the oxygen pre-burner 70A.

The propellant system 26 is configured to direct the fluid oxygen and the fluid hydrogen into the oxygen pre-burner 70A and the hydrogen pre-burner 70B such that the fluid oxygen and the fluid hydrogen may mix to provide an oxygen rich (and hydrogen lean) fuel mixture within each respective combustion chamber 88A, 88B (generally referred to as 88). More particularly, a relatively high mass flow of the fluid oxygen may be injected into each combustion chamber 88, whereas a relatively low mass flow of the fluid hydrogen may be injected into each combustion chamber 88. The oxygen rich fuel mixture may thereby (e.g., only) be partially combusted (e.g., reacted) within each combustion chamber 88 to provide combustion product of water ($H_2O$) vapor and oxygen ($O_2$) gas. In other words, the fluid oxygen ($O_2$) and the fluid hydrogen ($H_2$) may be metered into each combustion chamber 88 such that (e.g., only) a select percentage of the fluid oxygen reacts with substantially all or an entirety of the fluid hydrogen to form water ($H_2O$) vapor. The exact mixture ratio of hydrogen to oxygen in the pre-burners 70A and 70B may be selected to reduce/minimize the pre-burner exit temperatures (e.g., at inlets to 82A and 82B) to values below which the turbopump turbines 74A and 74B need not to be cooled. However, the present disclosure is not limited to uncooled pre-burner configurations.

The combustion products from the combustion chamber 88A of the oxygen pre-burner 70A flow through the oxygen turbopump turbine 74A causing the oxygen turbine rotor 86A to rotate. The rotation of the oxygen turbine rotor 86A drives rotation of the oxygen pump rotor 80A and, thus, pressurization of the fluid oxygen received from the oxygen reservoir 56. The combustion products are subsequently directed from the oxygen turbopump turbine 74A to the combustor 30.

The combustion products from the combustion chamber 88B of the hydrogen pre-burner 70B flow through the hydrogen turbopump turbine 74B causing the hydrogen turbine rotor 86B to rotate. The rotation of the hydrogen turbine rotor 86B drives rotation of the hydrogen pump rotor 80B and, thus, pressurization of the fluid hydrogen received from the hydrogen reservoir 58. The combustion products are subsequently directed from the hydrogen turbopump turbine 74B to the combustor 30.

The combustion products from the oxygen turbopump system 62A and the hydrogen turbopump system 62B are directed into the combustion chamber 90 of the combustor 30. Additional fluid hydrogen is also directed (e.g., injected) into the combustion chamber 90 through the hydrogen injection system 92 and its spray bars 94, where the hydrogen injection system 92 receives the fluid hydrogen from the hydrogen turbopump system 62B. The propellant system 26 is configured to direct the additional fluid hydrogen into the combustor 30 such that (a) the leftover (e.g., unreacted) fluid oxygen within the combustion products from the oxygen turbopump system 62A and the hydrogen turbopump system 62B and (b) the additional fluid hydrogen mix to provide a substantially stoichiometric fuel mixture within the combustion chamber 90. The propellant system 26, for example, may meter the additional fluid hydrogen directed into the combustion chamber 90 such that there is just enough (or slightly less than enough) fluid hydrogen to fully combust with the leftover fluid oxygen to provide combustion products of water ($H_2O$) vapor and little or no oxygen ($O_2$) gas and/or hydrogen ($H_2$) gas. The propellant system 26, more particularly, may meter the additional fluid hydrogen directed into the combustion chamber 90 to facilitate (e.g., complete) stoichiometric combustion of the additional fluid hydrogen and the leftover fluid oxygen. However, in some embodiments, slightly less additional fluid hydrogen may be directed into the combustor 30 to reduce or prevent a likelihood of leftover fluid hydrogen (e.g., $H_2$ gas) in the combustion products.

The combustion products from the combustion chamber 90 of the combustor 30 flow through the power turbine 32 causing the power turbine rotor 40 to rotate. The combustion products are subsequently exhausted from the powerplant 20 and its engine 24 through the exhaust 34, which may provide powerplant thrust. The rotation of the power turbine rotor 40 drives rotation of the mechanical load 22 and its driven rotor 28. The combustion products are subsequently directed from the power turbine 32 through the exhaust 34 and its variable area exhaust nozzle 48 into the external environment 96; e.g., the environment outside of and around the powerplant 20/the aircraft. Where the driven rotor 28 is configured as the propulsor rotor, the rotation of the driven rotor 28 may propel another airflow (e.g., a bypass airflow) along and/or external to the powerplant 20 and its engine 24 to provide additional powerplant thrust. Where the driven rotor 28 is configured as the generator rotor, the rotation of the driven rotor 28 may facilitate generation of electricity by the electrical power generator.

Figure 3:
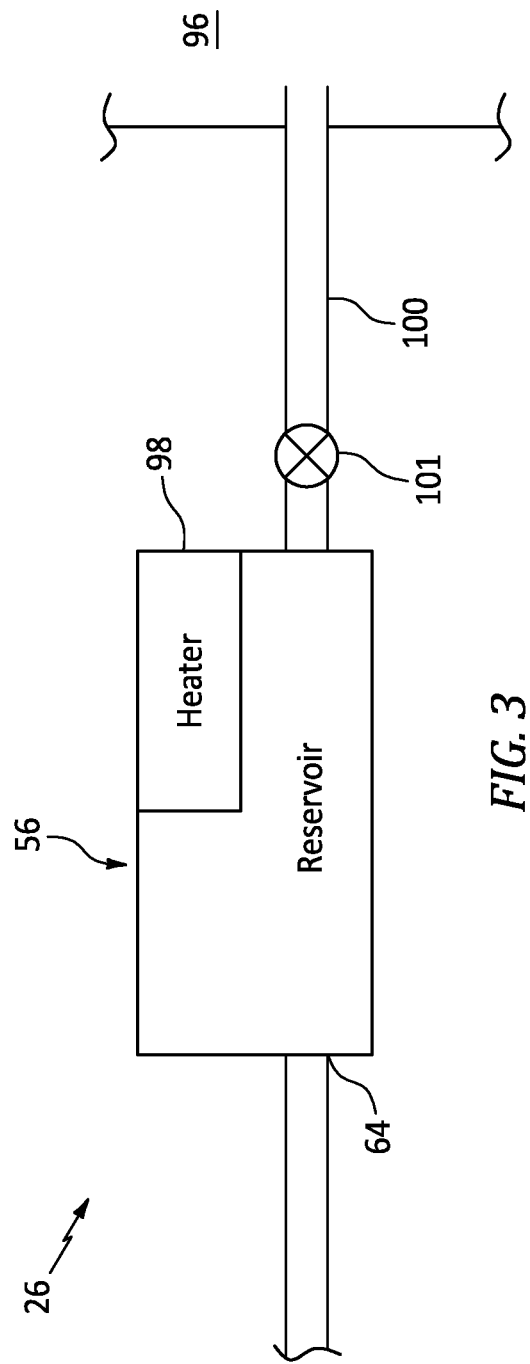
FIG. 3 is a schematic illustration of a portion of a propellant system about an oxygen reservoir configured with a heater and a vent.
Figure 4:
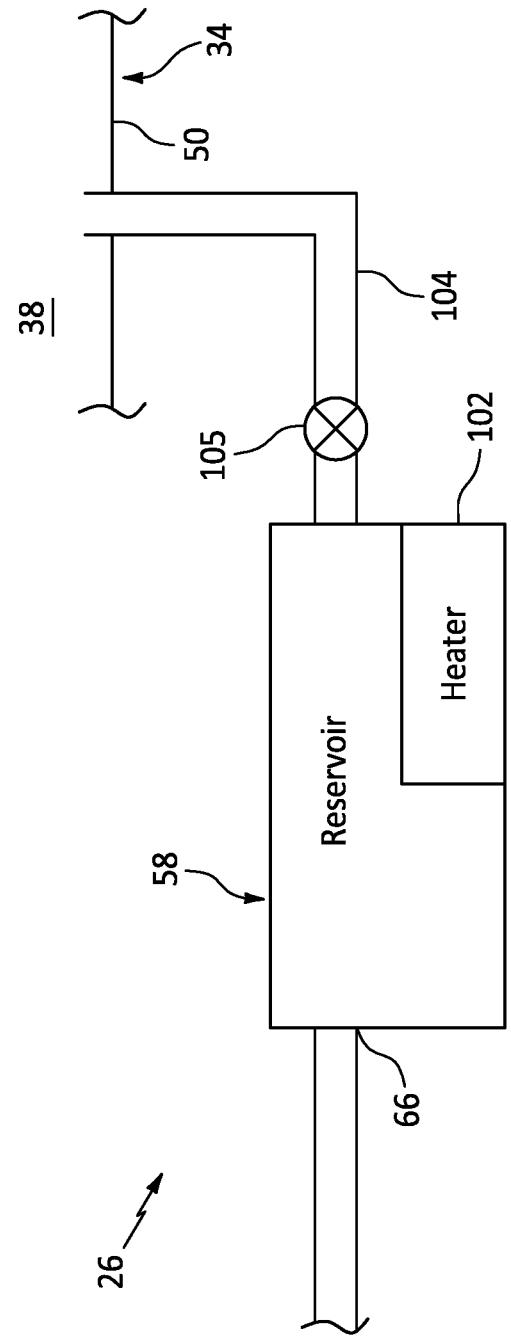
FIG. 4 is a schematic illustration of a portion of the propellant system about a hydrogen reservoir configured with a heater and a vent.

In some embodiments, referring to FIG. 3, the oxygen reservoir 56 may be configured with an oxygen heater 98. This oxygen heater 98 is configured to heat the fluid oxygen within the oxygen reservoir 56 to maintain pressure within the oxygen reservoir 56 above a threshold. The pressure within the oxygen reservoir 56, for example, may be maintained at a predetermined value or within a range of values to prevent collapse of the oxygen reservoir 56 as the fluid oxygen is removed from the oxygen reservoir 56.

In some embodiments, the oxygen reservoir 56 may be configured with an overpressure vent 100. This overpressure vent 100 is configured to selectively fluidly couple the oxygen reservoir 56 to, for example, the external environment 96. For example, when vapor pressure within the oxygen reservoir 56 rises above a threshold, a valve 101 for the overpressure vent 100 may open to direct some of the fluid oxygen vapor (e.g., 02 gas) out of the oxygen reservoir 56 through the overpressure vent 100 and into the external environment 96.

In some embodiments, the hydrogen reservoir 58 may be configured with an overpressure vent 104. This overpressure vent 104 is configured to selectively fluidly couple the hydrogen reservoir 58 to the core flowpath 38, for example, within the exhaust 34. For example, when vapor pressure within the hydrogen reservoir 58 rises above a threshold, a valve 105 for the overpressure vent 104 may open to direct some of the fluid hydrogen vapor (e.g., $H_2$ gas) out of the hydrogen reservoir 58 through the overpressure vent 104 and into the exhaust 34 to be burnt off; e.g., where the combustion products directed out of the combustor 30 include some leftover fluid oxygen (e.g., $O_2$ gas).

Figure 5:
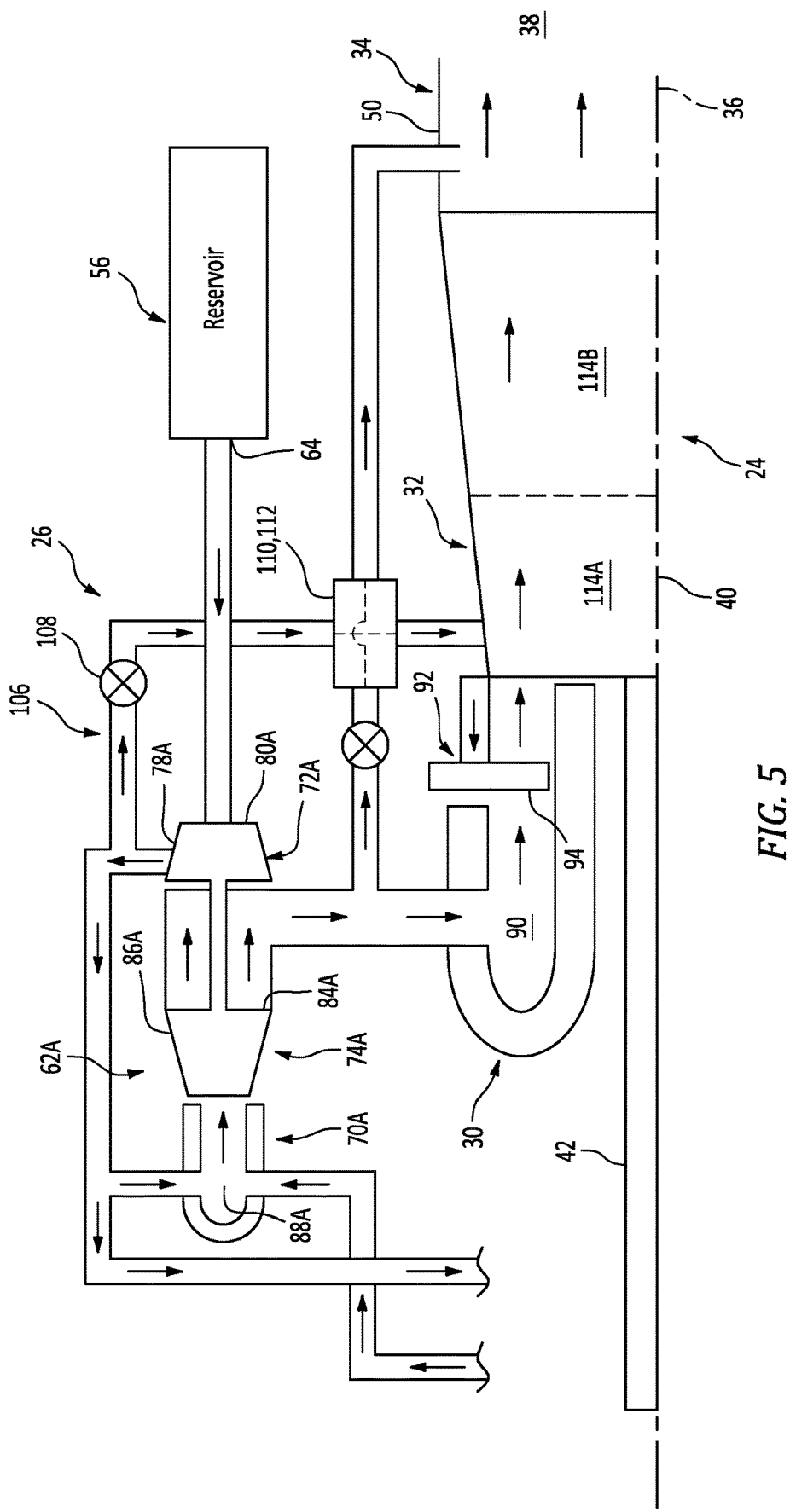
FIG. 5 is a schematic illustration of a portion of the powerplant configured with a turbine cooling circuit.

In some embodiments, referring to FIG. 5, the propellant system 26 may be further configured for cooling the power turbine 32. Such cooling may facilitate powerplant operation with higher combustion product pressures and corresponding higher combustion product temperatures. Increasing a pressure ratio of the powerplant 20 may increase efficiency of the powerplant 20.

The propellant system 26 of FIG. 5 includes a turbine cooling circuit 106. This turbine cooling circuit 106 extends between and is fluidly coupled with oxygen turbopump pump 72A and its outlet 78A and the power turbine 32. The turbine cooling circuit 106 of FIG. 5 include a flow regulator 108 (e.g., a valve) and a circuit heater 110 fluidly coupled between the flow regulator 108 and the power turbine 32. The flow regulator 108 is configured to regulate a flow of the pressurized fluid oxygen directed from the oxygen turbopump pump 72A to the power turbine 32. The circuit heater 110 is configured to heat the fluid oxygen provided to the power turbine 32 for cooling. The circuit heater 110 of FIG. 5, for example, is configured as a (e.g., gas-to-liquid) heat exchanger 112. This heat exchanger 112 is operable to transfer heat energy from combustion products for the oxygen turbopump system 62A to the fluid oxygen. The combustion products provided to the heat exchanger 112 may be bled from a flowpath between the oxygen turbopump turbine 74A and the combustor 30. The combustion products output from the heat exchanger 112 may be directed into the core flowpath 38, for example, within the exhaust 34.

In some embodiments, the fluid oxygen provide to the power turbine 32 for cooling may be in the form of entirely (e.g., only) or substantially (e.g., at least 95%) liquid oxygen. With such an arrangement, a heat of vaporization of the liquid oxygen to oxygen gas may provide enhance cooling for the power turbine 32. In other embodiments, the fluid oxygen provided to the power turbine 32 for cooling may be in a form of entirely (e.g., only) or substantially (e.g., at least 95%) oxygen gas. In still other embodiments, the fluid oxygen provided to the power turbine 32 for cooling may be in a form of a mixture of liquid oxygen and oxygen gas.

In some embodiments, the fluid oxygen provided by the turbine cooling circuit 106 to the power turbine 32 may be used for cooling an entire length of the power turbine 32; e.g., from inlet to outlet. In other embodiments, the fluid oxygen provided by the turbine cooling circuit 106 to the power turbine 32 may be used for cooling a select portion of the power turbine 32. An upstream portion 114A of the power turbine 32 of FIG. 5 at the power turbine inlet, for example, may be cooled using the fluid oxygen provided by the turbine cooling circuit 106. A downstream portion 114B of the power turbine 32 at the power turbine outlet may be uncooled, or at least not directly cooled by the fluid oxygen provided by the turbine cooling circuit 106.

Figure 6:
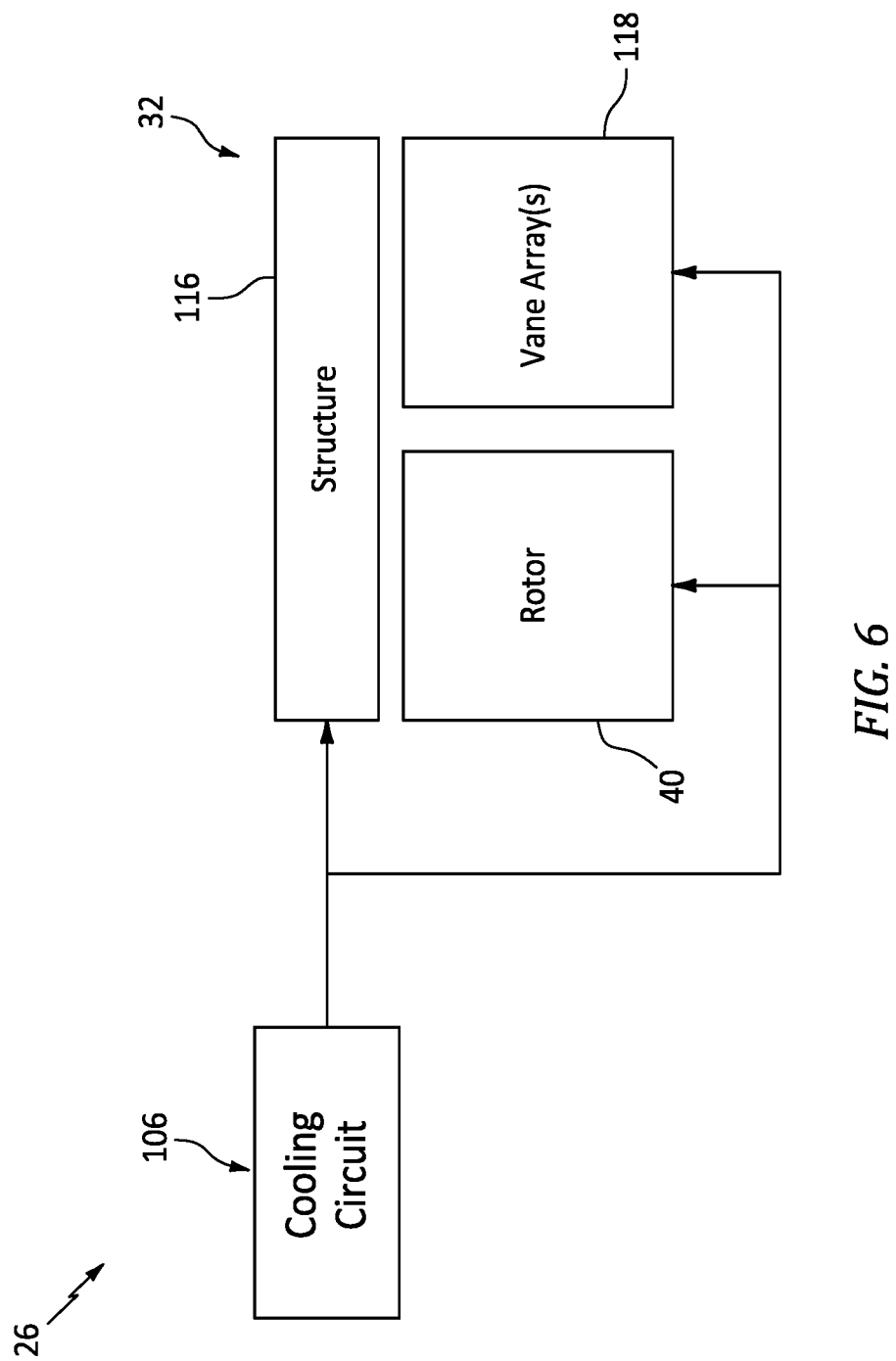
FIG. 6 is a schematic illustration of the turbine cooling circuit servicing various components of a power turbine.

In some embodiments, referring to FIG. 6, the fluid oxygen provided by the turbine cooling circuit 106 may be used for cooling the power turbine rotor 40. The fluid oxygen may also or alternatively be used for cooling a structure 116 circumscribing the power turbine rotor 40; e.g., a turbine case, a turbine blade outer air seal (BOAS), etc. The fluid oxygen may also or alternatively be used for cooling one or more stator vane arrays 118 within the power turbine 32.

Figure 7:
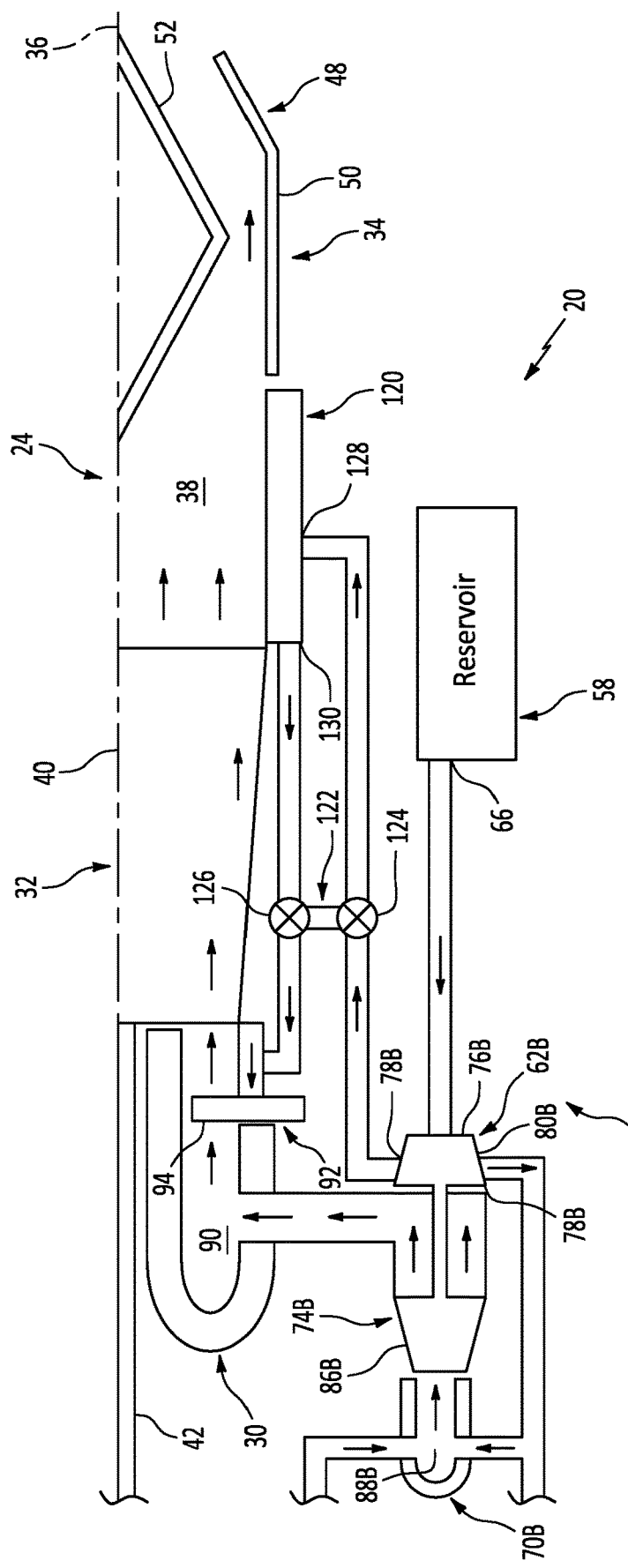
FIG. 7 is a schematic illustration of a portion of the powerplant configured with a recuperator.

In some embodiments, referring to FIG. 7, the propellant system 26 may also include a recuperator 120 between and fluidly coupled with one of the hydrogen pump outlets 78B and the hydrogen injection system 92. The recuperator 120 of FIG. 7 is configured with the core flowpath 38 (e.g., connected to or part of the sidewall 50 and/or another case for the exhaust 34) and may extends circumferentially about (e.g., circumscribe) the core flowpath 38. The recuperator 120 is operable to transfer heat energy from the combustion products output from the power turbine 32 and flowing through the exhaust 34 to the fluid hydrogen directed from the hydrogen turbopump pump 72B to the hydrogen injection system 92. The recuperator 120 may thereby recuperate heat energy being exhausted from the power turbine 32 for preheating the fluid hydrogen provided to the hydrogen injection system 92.

In some embodiments, the fluid hydrogen provide to the hydrogen injection system 92 may be in the form of entirely (e.g., only) or substantially (e.g., at least 95%) liquid hydrogen. In other embodiments, the fluid hydrogen provided to the hydrogen injection system 92 may be in a form of entirely (e.g., only) or substantially (e.g., at least 95%) hydrogen gas. In still other embodiments, the fluid hydrogen provided to the hydrogen injection system 92 may be in a form of a mixture of liquid hydrogen and hydrogen gas.

In some embodiments, the propellant system 26 may include a bypass circuit 122 for selectively bypassing the recuperator 120. This bypass circuit 122 may include one or more flow regulators 124 and 126; e.g., valves. The upstream flow regulator 124 may be fluidly coupled with and upstream of an inlet 128 to the recuperator 120. The downstream flow regulator 126 may be fluidly coupled with and downstream of an outlet 130 from the recuperator 120.

Figure 8:
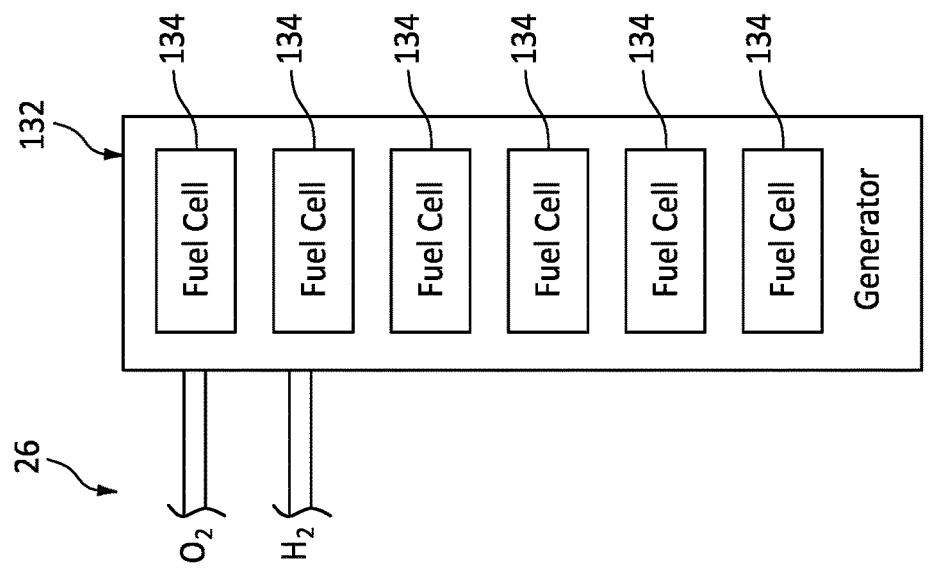
FIG. 8 is a schematic illustration of a portion of the fuel system servicing an electrical generator with one or more fuel cells.

In some embodiments, referring to FIG. 8, the powerplant 20 may further include an electrical generator 132 with one or more fuel cells 134. The propellant system 26 of FIG. 8 is configured to provide the fluid oxygen and the fluid hydrogen to the fuel cells 134 for generating electricity. The electricity generated by the electrical generator 132 and its fuel cells 134 may be used to power engine accessories such as an engine controller (e.g., a FADEC), which may eliminate traditional Power Takeoff requirements via, for example, a tower shaft and accessory gearbox. The electricity may also or alternatively be provided to the aircraft.

Figure 9:
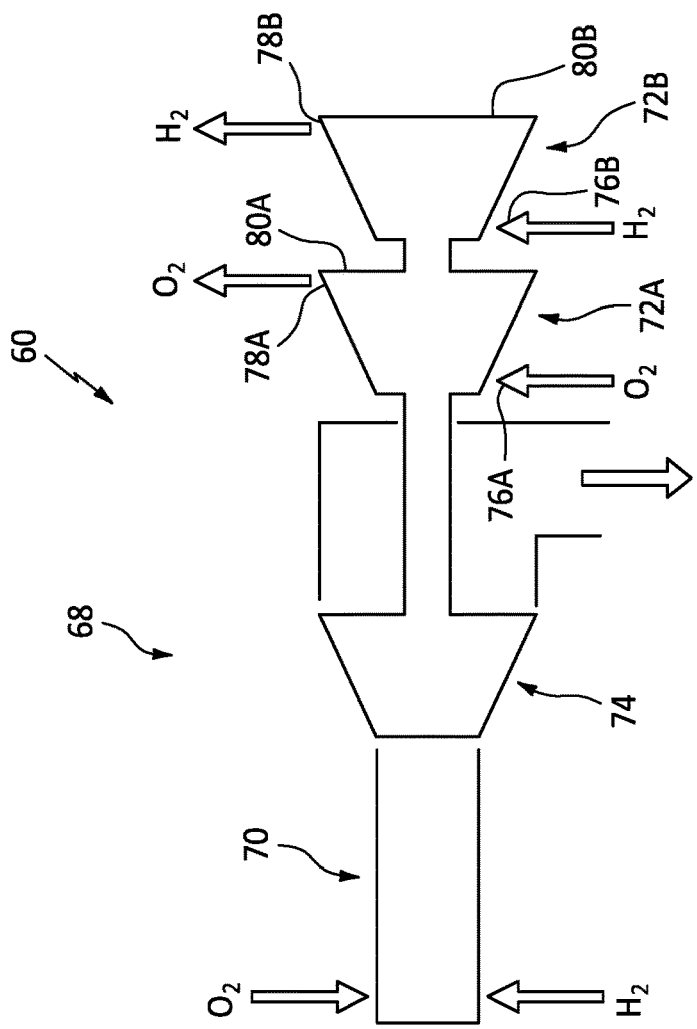
FIG. 9 is a schematic illustration of a turbopump system configured with a single rotating assembly for both an oxygen pump and a hydrogen pump.

In some embodiments, referring to FIG. 9, the oxygen turbopump system and the hydrogen turbopump system may be configured as a common turbopump system 60 with a single rotating assembly. The oxygen pump rotor 80A and the hydrogen pump rotor 80B, for example, may be connected to and rotatably driven by a common turbine rotor 74. This turbine rotor 74 may be downstream of a common pre-burner 70.

Figure 10:
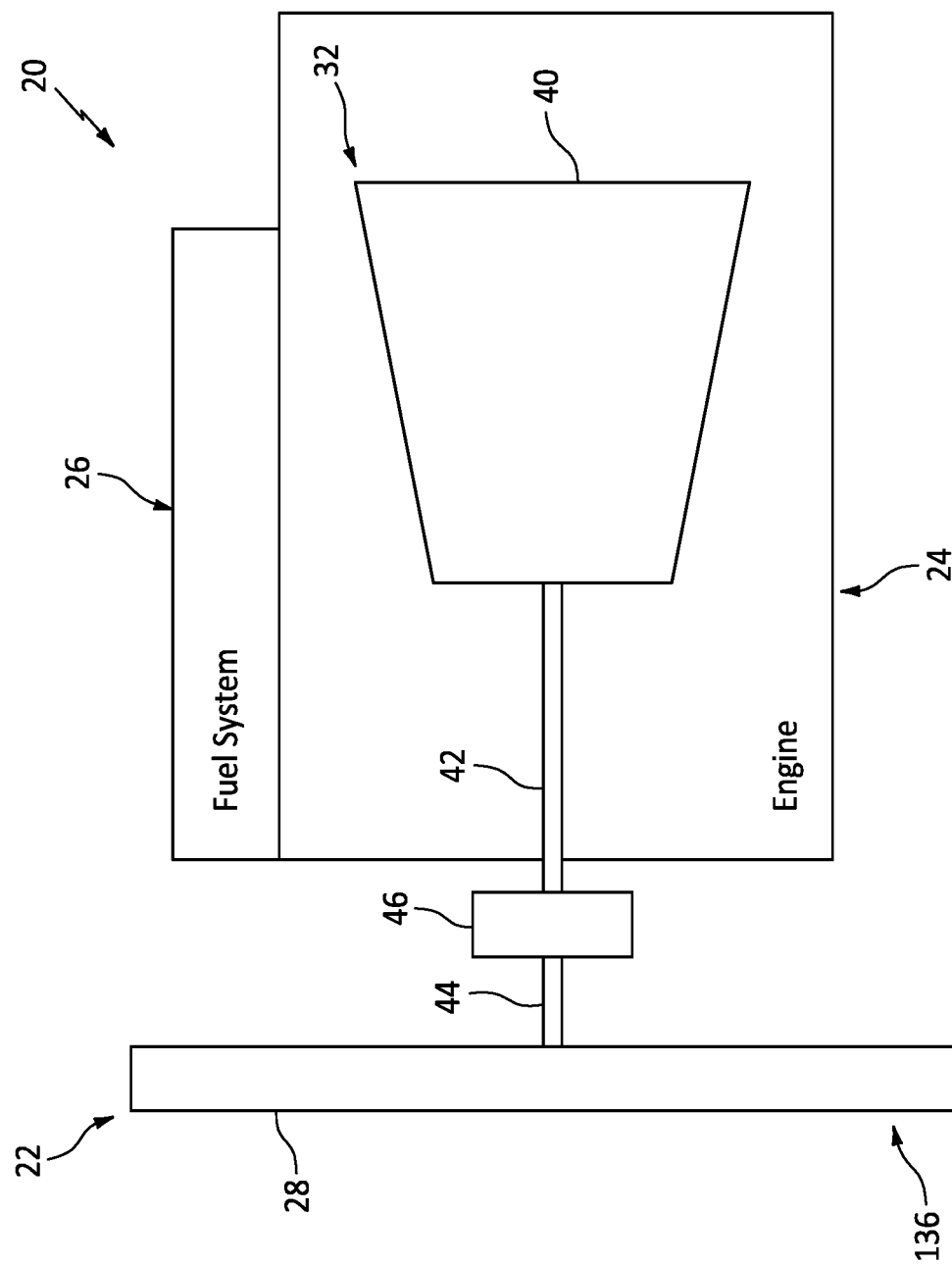
FIG. 10 is a schematic illustration of the powerplant configured with a mechanically driven propulsor rotor.

In some embodiments, referring to FIG. 10, the powerplant 20 may include a mechanically driven propulsor rotor 136. The mechanical load 22 of FIG. 10, for example, is configured as or otherwise includes the propulsor rotor 136. This propulsor rotor 136 is mechanically coupled to and rotatably driven by the power turbine 32.

Figure 11A:
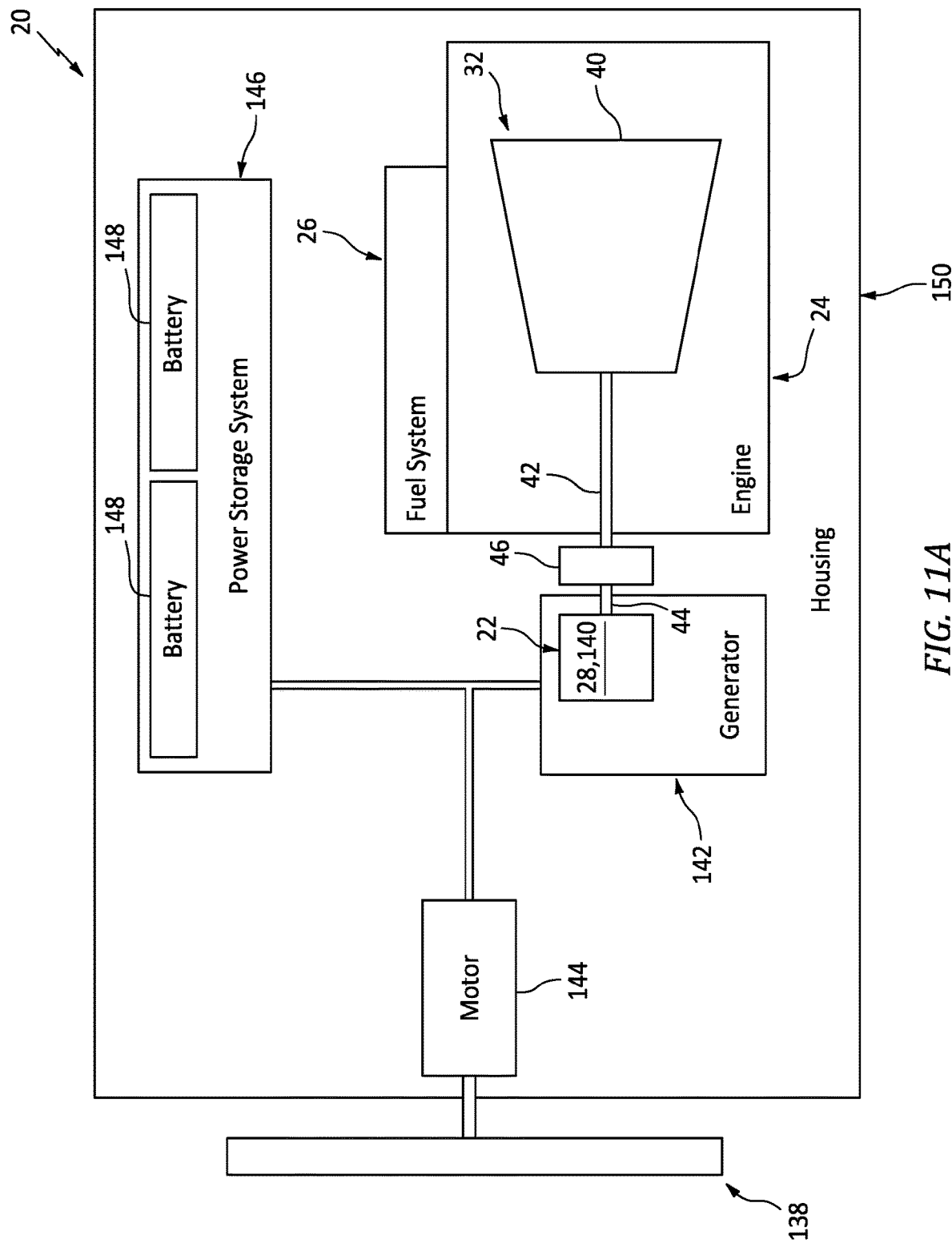
FIGS. 11A and 11B are schematic illustrations of the powerplant with various electrically driven propulsor rotors.
Figure 11B:
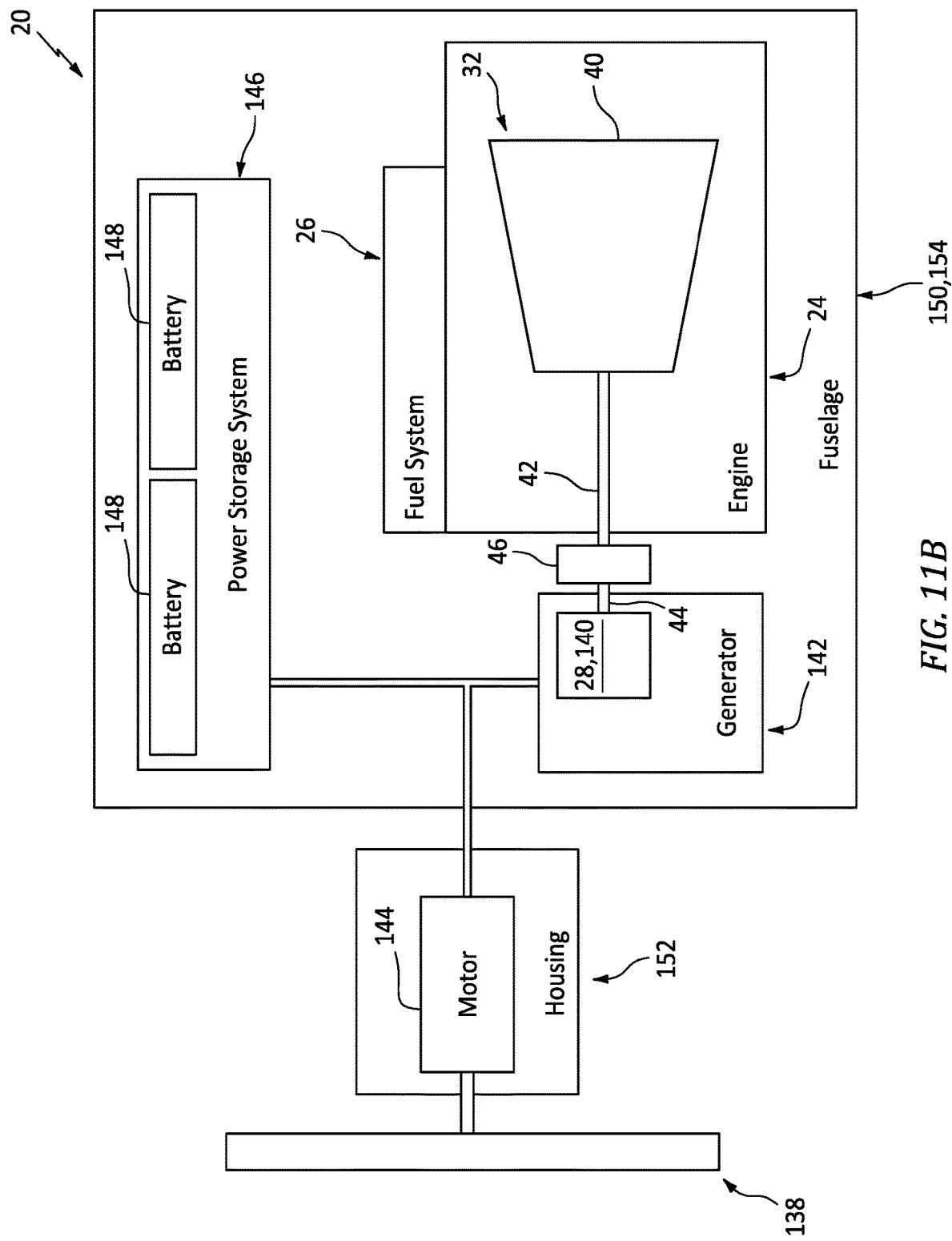

In some embodiments, referring to FIGS. 11A and 11B, the powerplant 20 (e.g., a hybrid powerplant) may include an electrically driven propulsor rotor 138. The mechanical load 22 of FIGS. 11A and 11B, for example, is configured as or otherwise includes a generator rotor 140 for an electrical power generator 142. The propulsor rotor 138 of FIGS. 11A and 11B is driven by an electric motor 144. This electric motor 144 may receive electricity directly from the electrical power generator 142, or indirectly through a power storage system 146 (e.g., a bank of one or more batteries 148 or flywheels).

In some embodiments, referring to FIG. 11A, the propulsor rotor 138 and its electric motor 144 may be arranged with a remainder of the powerplant 20 within a common region of an aircraft. The powerplant components 22, 24, 26, 142, 144 and 146 of FIG. 11A, for example, are arranged within a common housing 150 (e.g., a nacelle) connected to a wing or a fuselage of the aircraft. In other embodiments, referring to FIG. 11B, the propulsor rotor 138 and its electric motor 144 may be arranged remote from the remainder of the powerplant 20 (e.g., 22, 24, 26, 142 and 146). The propulsor rotor 138 and its electric motor 144, for example, may be arranged within a housing 152 (e.g., a nacelle) connected to the wing or the fuselage 154 of the aircraft. One or more of the remaining powerplant components (e.g., 22, 24, 26, 142 and 146) may be arranged within the fuselage 154 such that, for example, the fluid oxygen and the fluid hydrogen do not need to be stored within and/or routed through an aircraft wing. Such an arrangement may be possible since none of the pre-burners 70A, 70B of FIG. 1 (generally referred to as 70) nor the combustor 30 of FIG. 1 require outside air for combustion. Rather, as described above, each of the powerplant components 30, 70 receives the fluid oxygen for combustion with the fluid hydrogen.

Figure 12:
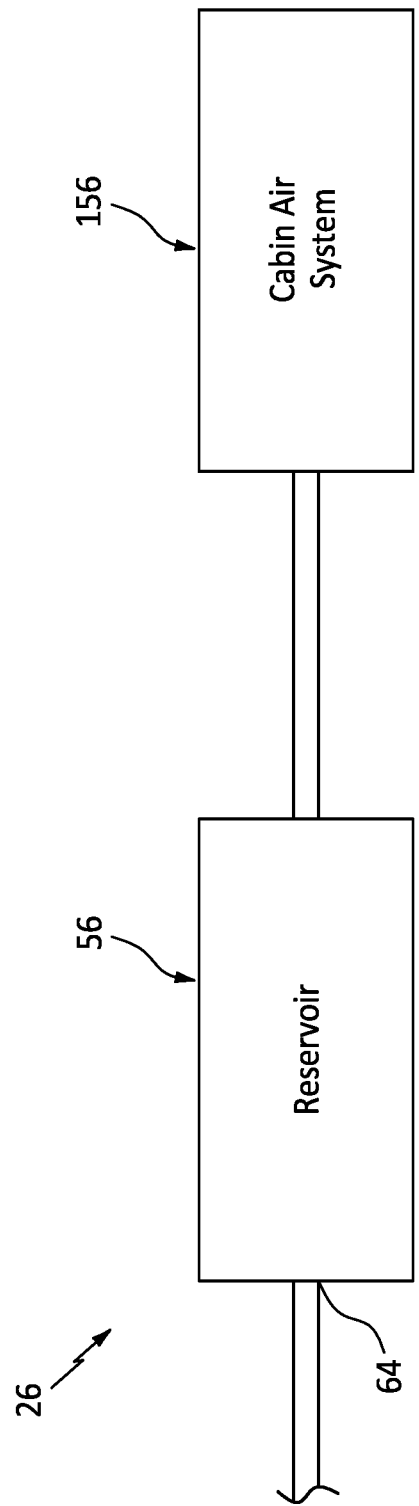
FIG. 12 is a schematic illustration of the fuel system servicing a cabin air system for an aircraft fuselage.

In some embodiments, referring to FIG. 12, the propellant system 26 may be configured to direct the fluid oxygen from the oxygen reservoir 56 to a cabin air system 156 for the aircraft. With such an arrangement, the fluid oxygen provided for operating the powerplant may also be used for providing supplemental oxygen people in the aircraft during an emergency.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant, comprising:
a pre-burner;
a combustor fluidly coupled with and downstream of the pre-burner;
a second pre-burner fluidly coupled with and upstream of the combustor;
a power turbine fluidly coupled with and downstream of the combustor;
a mechanical load rotatably driven by the power turbine; and
a propellant system configured to direct fluid oxygen and fluid hydrogen to the pre-burner to provide an oxygen rich fuel mixture for combustion within the pre-burner, and the propellant system further configured to direct the fluid hydrogen to the combustor for combustion within the combustor with oxygen within combustion products received from the pre-burner; and
the propellant system further configured to direct the fluid oxygen and the fluid hydrogen to the second pre-burner to provide a second oxygen rich fuel mixture for combustion within the second pre-burner, and the propellant system further configured to direct the fluid hydrogen to the combustor for combustion within the combustor with oxygen within second combustion products received from the second pre-burner.

2. The powerplant of claim 1, wherein
the fluid oxygen directed to the pre-burner comprises liquid oxygen; and
the fluid hydrogen directed to the pre-burner comprises liquid hydrogen.

3. The powerplant of claim 1, wherein the fluid hydrogen directed to the combustor comprises liquid hydrogen.

4. The powerplant of claim 1, wherein the fluid hydrogen directed to the combustor comprises hydrogen gas.

5. The powerplant of claim 1, wherein the propellant system comprises:
an oxygen reservoir; and
an oxygen turbopump including a turbopump turbine and a turbopump pump, the turbopump turbine fluidly coupled with and between the pre-burner and the combustor, the turbopump pump rotatably driven by the turbopump turbine, and the turbopump pump configured to direct the fluid oxygen from the oxygen reservoir to the pre-burner.

6. The powerplant of claim 5, further comprising an overpressure vent configured to fluidly couple the oxygen reservoir to an environment outside of the powerplant.

7. The powerplant of claim 1, wherein the propellant system comprises:
a hydrogen reservoir; and
a hydrogen turbopump including a turbopump turbine and a turbopump pump, the turbopump turbine fluidly coupled with and between the pre-burner and the combustor, the turbopump pump rotatably driven by the turbopump turbine, and the turbopump pump configured to direct the fluid hydrogen from the hydrogen reservoir to the pre-burner and to the combustor.

8. The powerplant of claim 1, wherein the propellant system is configured to direct the fluid oxygen to the power turbine for cooling the power turbine.

9. The powerplant of claim 8, wherein
an upstream section of the power turbine is cooled using the fluid oxygen; and
a downstream section of the power turbine is uncooled.

10. The powerplant of claim 1, wherein
the propellant system further comprises a recuperator, and the propellant system is configured to direct the fluid hydrogen to the combustor through the recuperator; and
the recuperator is configured to transfer heat energy from combustion products output from the power turbine to the fluid hydrogen.

11. The powerplant of claim 1, further comprising a variable area exhaust nozzle fluidly coupled with and downstream of the power turbine.

12. The powerplant of claim 1, wherein the mechanical load comprises at least one of a propulsor rotor or an electric generator.

13. The powerplant of claim 1, further comprising:
an electrical generator comprising a fuel cell;
the propellant system further configured to provide the fluid oxygen and the fluid hydrogen to the fuel cell.

14. A powerplant, comprising:
a pre-burner;
a combustor fluidly coupled with and downstream of the pre-burner;
a power turbine fluidly coupled with and downstream of the combustor;
a mechanical load rotatably driven by the power turbine; and
a propellant system configured to direct fluid oxygen and fluid hydrogen to the pre-burner to provide an oxygen rich fuel mixture for combustion within the pre-burner, and the propellant system further configured to direct the fluid hydrogen to the combustor for combustion within the combustor with oxygen within combustion products received from the pre-burner, wherein the propellant system comprises
an oxygen reservoir;
an oxygen turbopump including a turbopump turbine and a turbopump pump, the turbopump turbine fluidly coupled with and between the pre-burner and the combustor, the turbopump pump rotatably driven by the turbopump turbine, and the turbopump pump configured to direct the fluid oxygen from the oxygen reservoir to the pre-burner; and
a heater configured for heating the fluid oxygen within the oxygen reservoir.

15. A powerplant, comprising:
a pre-burner;
a combustor fluidly coupled with and downstream of the pre-burner;
a power turbine fluidly coupled with and downstream of the combustor;
a mechanical load rotatably driven by the power turbine; and
a propellant system configured to direct fluid oxygen and fluid hydrogen to the pre-burner to provide an oxygen rich fuel mixture for combustion within the pre-burner, and the propellant system further configured to direct the fluid hydrogen to the combustor for combustion within the combustor with oxygen within combustion products received from the pre-burner, wherein the propellant system comprises
a hydrogen reservoir;
a hydrogen turbopump including a turbopump turbine and a turbopump pump, the turbopump turbine fluidly coupled with and between the pre-burner and the combustor, the turbopump pump rotatably driven by the turbopump turbine, and the turbopump pump configured to direct the fluid hydrogen from the hydrogen reservoir to the pre-burner and to the combustor; and
a heater configured for heating the fluid hydrogen within the hydrogen reservoir.

16. A powerplant, comprising:
a pre-burner;
a combustor fluidly coupled with and downstream of the pre-burner;
a power turbine fluidly coupled with and downstream of the combustor;
a mechanical load rotatably driven by the power turbine;
a propellant system configured to direct fluid oxygen and fluid hydrogen to the pre-burner to provide an oxygen rich fuel mixture for combustion within the pre-burner, and the propellant system further configured to direct the fluid hydrogen to the combustor for combustion within the combustor with oxygen within combustion products received from the pre-burner, wherein the propellant system comprises
a hydrogen reservoir; and
a hydrogen turbopump including a turbopump turbine and a turbopump pump, the turbopump turbine fluidly coupled with and between the pre-burner and the combustor, the turbopump pump rotatably driven by the turbopump turbine, and the turbopump pump configured to direct the fluid hydrogen from the hydrogen reservoir to the pre-burner and to the combustor;
an exhaust fluidly coupled with and downstream of the power turbine; and
an overpressure vent configured to fluidly couple the hydrogen reservoir to the exhaust.

* * * * *